US008747676B2

(12) United States Patent
Hughes et al.

(10) Patent No.: US 8,747,676 B2
(45) Date of Patent: Jun. 10, 2014

(54) HEAVY METAL REMOVAL METHODS AND SYSTEMS

(75) Inventors: Mark A. Hughes, Ponca City, OK (US);
Roland Schmidt, Bartlesville, OK (US);
John M. Hays, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 131 days.

(21) Appl. No.: 13/155,769

(22) Filed: Jun. 8, 2011

(65) Prior Publication Data

US 2011/0296991 A1 Dec. 8, 2011

Related U.S. Application Data

(60) Provisional application No. 61/352,658, filed on Jun. 8, 2010.

(51) Int. Cl.
*C02F 1/42* (2006.01)

(52) U.S. Cl.
USPC .......... 210/688; 210/914; 210/502.1; 95/134; 96/108; 502/423

(58) Field of Classification Search
USPC .................. 502/416, 417, 420, 423; 95/134; 210/660, 285, 502.1, 688, 914; 96/108
See application file for complete search history.

(56) References Cited

U.S. PATENT DOCUMENTS

| | | | |
|---|---|---|---|
| 3,786,619 A * | 1/1974 | Melkersson et al. | ............ 95/134 |
| 3,791,968 A | 2/1974 | Whitehurst, et al. | |
| 3,793,185 A | 2/1974 | Whitehurst et al. | |
| 4,274,842 A | 6/1981 | Lindau | |
| 5,854,173 A | 12/1998 | Chang et al. | |
| 5,888,926 A | 3/1999 | Biswas et al. | |
| 5,948,143 A | 9/1999 | Sjostrom et al. | |
| 6,248,217 B1 | 6/2001 | Biswas et al. | |
| 6,719,828 B1 | 4/2004 | Lovell et al. | |
| 7,033,419 B1 | 4/2006 | Granite et al. | |
| 2003/0104937 A1 | 6/2003 | Sinha | |
| 2007/0265161 A1 * | 11/2007 | Gadkaree et al. | ............. 502/417 |
| 2008/0282889 A1 * | 11/2008 | Boardman et al. | ............. 95/129 |
| 2010/0078390 A1 * | 4/2010 | Cross et al. | .................. 210/679 |

FOREIGN PATENT DOCUMENTS

| | | | | |
|---|---|---|---|---|
| JP | 58-27689 | * | 2/1983 | ................ C02F 1/62 |
| JP | 58027689 | | 2/1983 | |
| WO | WO 2009108220 A1 * | | 9/2009 | ................ B23B 1/02 |

OTHER PUBLICATIONS

PCT Notification of Transmittal of the International Search Report and the Written Opinion of the International Searching Authority, or the Declaration, International Application No. PCT/US2011/039622, International Filing Date Jun. 8, 2011, 11 pages.

* cited by examiner

*Primary Examiner* — Duane Smith
*Assistant Examiner* — Cabrena Holecek
(74) *Attorney, Agent, or Firm* — Phillips 66 Company

(57) ABSTRACT

A support impregnated with selenium and capable of effectively removing a heavy metal from a process stream that is at an ambient temperature or is at an elevated temperature.

8 Claims, 1 Drawing Sheet

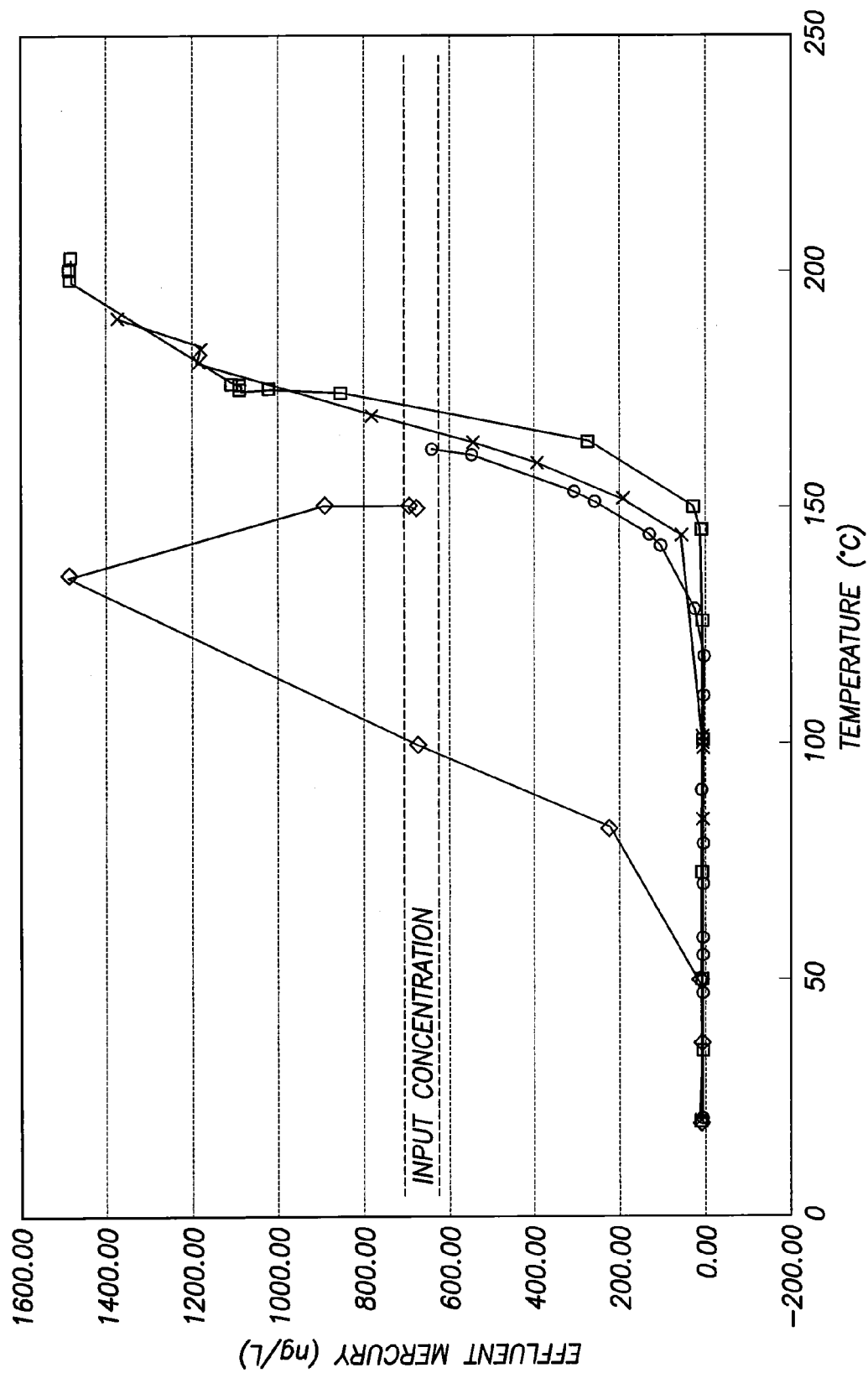

ical source may include any of a number of typical inorganic materials, including silica, alumina, zeolites, metal oxides, as examples.

HEAVY METAL REMOVAL METHODS AND SYSTEMS

CROSS-REFERENCE TO RELATED APPLICATION

This application is a non-provisional application which claims the benefit of and priority to U.S. Provisional Application Ser. No. 61/352,658 filed Jun. 8, 2010, entitled "Heavy Metal Removal Methods and Systems," which is hereby incorporated by reference in its entirety.

BACKGROUND

The described application relates generally to methods and systems involving removal of heavy metals, particularly removal of heavy metals at elevated temperatures.

Heavy metal removal at elevated temperatures is often difficult, particularly for highly volatile heavy metals. Heavy metals, such as high density, transition and toxic metals, are typically removed by one of several methods, including adsorption, extraction or condensation. At high temperatures, however, some present methods perform poorly or fail to remove one or more heavy metals. Further, other impurities can create problems for sulfur based sorbent materials.

SUMMARY

Disclosed herein are methods and systems for heavy metal removal from a process stream, particularly at high temperatures, that overcome or alleviate one or more problems observed in the prior art.

In some embodiments, a support impregnated with one or more materials, at least one of which comprises selenium and in combination with the support is capable of removing a heavy metal, including a volatile heavy metal that is in a gas phase, from a process stream. The support generally comprises an activated carbon or inorganic material. The support when impregnated is stable when added to the process stream. The support when impregnated is operational at low temperatures as well as elevated temperatures. The temperature may be at or below an ambient temperature, at about or greater than 50° C., or at about or greater than 100° C. Thus, the combination of material and support together remove heavy metal from the process stream gas even when the stream is at an elevated temperature.

For some embodiments, a system for removal of one or more heavy metals from a process stream includes a porous support impregnated with selenium, wherein the support is made of a substrate made porous and the process stream is in fluid communication with the support. Temperature of the process stream may be greater than 100° C. The porous support may be activated carbon. The selenium may be in the form of elemental selenium. In some embodiments, the selenium may impregnate the porous support at a temperature greater than about 600° C. in an inert atmosphere. The impregnated support may be 6.5 wt. % or greater selenium. The heavy metal may include mercury. The support may be carbon or an inorganic material. The support may be shaped into particles or pellets about 4 mm in size or less.

According to some embodiments, a support for the removal of one or more heavy metals from a process stream includes a substrate impregnated with selenium to provide the support that is at a temperature greater than 100° C. and is suitable for use in removal of one or more heavy metal from the process stream, wherein the substrate is activated to become porous before being impregnated. The substrate may be activated carbon. The selenium may be in the form of elemental selenium. In some embodiments, the selenium may impregnate the substrate at a temperature greater than about 600° C. in an inert atmosphere. The impregnated substrate may include 6.5 wt. % or greater selenium. The heavy metal may include mercury.

In additional embodiments, a method for removal of one or more heavy metals from a process stream includes the steps of: preparing a porous support, wherein a substrate for the porous support is activated to become porous; impregnating the porous support with selenium; preparing a bed of the impregnated porous support; and running the process stream through the bed. The temperature may be greater than 50° C. The temperature may be greater than 100° C. The step of impregnating the porous support may occur for at least about 20 minutes or for up to 48 hours. The bed may be a packed column of the impregnated porous support and the column may be made of a noncorrosive material. In some embodiments, the step of impregnating the porous support may include placing the porous support with selenium in an inert environment and heating to a temperature greater than about 600° C. The heavy metal may include mercury.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For more complete understanding of the features and advantages of the inventions described herein, reference is now made to a description of the invention along with accompanying FIGURE, wherein:

FIG. 1 depicts the behavior of a support described herein at varying temperatures in the presence of a heavy metal as compared with the behavior of alternative supports.

DESCRIPTION

Although making and using various embodiments are discussed in detail below, it should be appreciated that the description provides many inventive concepts that may be embodied in a wide variety of contexts. Any specific embodiments discussed herein are merely illustrative of ways to make and use the invention, and do not limit the scope of the invention.

References will now be made to the drawing. The drawing FIGURE is not necessarily to scale and certain features may be shown exaggerated in scale or in somewhat generalized or schematic form in the interest of clarity and conciseness.

Combustion, process and/or effluent streams include vapor phase heavy metals and sub-micron particulate matter with one or more heavy metals among other constituents. Described herein is a system and method of removing the one or more heavy metals. The combustion, process and/or effluent stream may originate as a liquid, solid or gas or combinations thereof. Suitable heavy metals are those known to one skilled in the relevant art, such as $Pb^{2+}$, $Mn^{2+}$, $Cd^{2+}$, $Cu^{2+}$, $Zn^{2+}$, $Fe^{2+}$, $Fe^{3+}$, $Cr^{3+}$, $Al^{3+}$ and $Hg^{2+}$, as examples.

In one or more embodiments, removal of heavy metals utilizes a support impregnated with selenium for sorption of the heavy metal. The support is generally in the form of carbon or an inorganic material. The carbon source may include any of a number of typical carbon materials, including coal, shells, sawdust, lignite, as examples. The inorganic material may include substrates derived from alumina, silica, clay, mullite, aluminum titinate, titania, zirconia, ceria particles, and the like.

The support is first formed to a desired and predetermined particle size. Suitable particle sizes include 10 mm or less or may be 4 mm or less. It is noted that smaller particle sizes are preferable when the process stream is a liquid. The shaping and sizing to obtain a desired particle size may occur via molding and/or crushing methods, as examples, such as those known to one of skill in the relevant art. The shaped and sized particles are often referred to as pellets, granules or powders, depending on their shape, size and/or other characteristics. For use, the support (as shaped and sized particles) is generally porous, which increases the surface area of the support and may include creating internal surfaces. In some embodiments, the shaped and sized support as a starting material has an increased surface area (e.g., is porous). In one or more embodiments the shaped and sized support as a starting material must be made to have an increased surface area (e.g., porous).

The support with increased surface area (e.g., in a porous state) is capable of becoming impregnated with selenium and/or additional materials. In some embodiments, the support with increased surface area may be pretreated to improve binding with selenium. In some instances, selenium loading of 1-10 wt. % is acceptable for use. In addition, impregnation of greater than 10 wt. % selenium loading or greater than 20 wt. % selenium loading may be achieved as described herein.

When using activated carbon, previous reports have shown that activated carbon is capable of removing some metals from a process stream containing the select metals. The limitation of metal removal by activated carbon is that it is competitive and effective for removal of only trace quantities of certain metals. In addition, activated carbon does not generally bind well to many metals, such as heavy metals. While activated carbon is effective at adsorbing select metals at lower or ambient temperatures, it desorbs these metals at higher temperatures (e.g., generally around 100° C.). Regeneration of spent carbon is also costly, which further limits its use.

The method includes preparing a support having a large surface area, such as activated carbon or an activated inorganic material, and impregnating the support with at least selenium. In one or more embodiments, the selenium is in the form of elemental selenium. In addition or as an alternative, other forms of selenium may be used or may be used in combination with elemental selenium. For example, selenite may be reduced by a strong reducing agent (e.g., ascorbic acid, hydrazine hydrochloride, hydroxylamine hydrochloride) to form, in whole or in part, elemental selenium. Other forms of selenium include but are not limited to selenium salt and selenium oxide. In addition or as an alternative, other elements, molecules or compounds may also be present on the surface of the support, such as sulfur. Selenium may be synthesized from other compounds, which will generally provide an elemental form of selenium. Selenium, in an elemental and/or other form, is prepared for impregnating a support (with an increased surface area) as described herein by heating it in the presence of the support. In some embodiments, selenium, in one or more forms, is capable of impregnating the support at an elevated temperature in an inert atmosphere. The temperature here may be greater than the melting temperature of elemental selenium. The inert environment may include a gas or gas mixture, such as nitrogen, argon, helium, carbon dioxide, as examples. In other embodiments, selenium, in one or more forms, is capable of impregnating the support at a temperature that is below the melting temperature of elemental selenium. An example includes calcining a selenium salt. In still further embodiments, selenium, in one or more forms, is capable of impregnating the support at an elevated temperature in a reactive environment. An example includes reacting selenium oxide in hydrogen. In still further embodiments, a chemical reaction is used to add selenium to the support from a reactive gas, such as hydrogen selenide (often with sulfur dioxide). Still further, selenium in one form may be extracted and further oxidized (e.g., with sodium carbonate), converted to an acid and then reacted with a gas, such as sulfur dioxide.

In some embodiments, the support having an increased surface area, such as activated carbon or an activated inorganic material, is pretreated before impregnation with selenium. Pretreatment may provide sites for complexation with the selenium. Pretreatment will generally include an agent capable of complexing with selenium. Suitable pretreatments would include an alkaline base, halogen salt of an alkaline base, or the like that are capable of linking to the support and complexing with selenium. For example, the support having an increased surface area may be pretreated with potassium iodide and/or potassium hydroxide.

When selenium is in an elemental form, it may for one embodiment impregnate the porous support in an inert environment at an elevated temperature. In some embodiments, the elevated temperature used is greater than about 200° C., greater than 500° C., about 600° C., or about 650° C. or greater. Other approaches may load the selenium on the support without any such heating and still provide the selenium in suitable form for use. The inert environment is one created by a vacuum or by using an inert gas or gas mixture that may include nitrogen, argon, helium, carbon dioxide, as examples. Selenium is heated in the presence of the porous support for several minutes or for up to several hours. In one or more embodiments, heating generally proceeds for a couple hours, such as about 120 minutes. In further embodiments, heating may proceed to up to or greater than 48 hours.

In use, an impregnated support described herein may be provided in a bed. When packed in the bed, the selenium-laden support is generally in the form of particles, pellets or granules. In addition or as an alternative, the selenium-laden support may be a powder, which may be present in the process stream and later collected via a filter or mesh, as examples. The material selected for the column itself is generally based on the process stream composition and temperature.

In one example, 1 g of powdered elemental selenium was heated to 650° C. in a vacuum chamber with 9 g of bituminous activated carbon pellets having particle sizes of, on average, about 0.9 mm in diameter and 10 mm in length. Heating was continued for about 120 minutes. After heating, the method produced a selenium laden carbon adsorbant. The adsorbant contained about 6.5% selenium by weight. No further heating step or activation step was required.

The selenium impregnated adsorbant described above was examined in the presence of a heavy metal. A glass column having dimensions of ¼ inch in diameter and 2 cm in length was packed with the selenium impregnated pellets and placed in a chamber having an inlet and an outlet. Elemental mercury ($Hg^0$) was heated and then introduced into the chamber through the inlet and collected via the outlet. The input concentration of the mercury was in a range of 625-700 ng/L. The chamber was heated to various temperatures and the amount of mercury collected from the outlet was measured. The temperature of the chamber was adjusted from 0° C. to 200° C. A recording of the temperature vs. effluent mercury amount at the outlet using a support described herein is shown as the line with "x" in FIG. 1 The same method was repeated but only to a temperature of 150° C. and is shown as the line with "+" in FIG. 1. The examination was then replicated using instead a column filled with similarly sized pellets of non-impregnated activated carbon, which is shown as the line with diamonds on FIG. 1. The examination was further replicated again and instead using a column filled with similarly sized pellets of activated carbon that had elemental sulfur dispersed on the surface. This is shown as the line with squares on FIG. 1.

The FIGURE shows that the selenium-laden support was effective at removing a heavy metal, such as mercury, at temperatures greater than 100° C. The un-doped activated carbon began desorption of the heavy metal at greater than 50° C. Thus, the selenium-laden support described herein performed well at ambient temperatures as well as elevated temperatures while the activated carbon alone did not perform well at temperatures greater than 50° C. The effectiveness of the selenium-impregnated support was reproducible.

Relative to sulfur impregnated activated carbon, the selenium-laden support may further provide resistance to other impurities within fluids in contact with the selenium-laden support for mercury removal. In addition, the selenium-laden support provides use for precursor materials such as selenium. The selenium-laden support when spent may provide a sulfur-free source of mercury.

The selenium-laden support described herein is regenerative. For example, the support may be heated at a high temperature (generally above about 150° C.) to initiate desorption of the mercury, thereby making the sorbent suitable for reuse. With the invention described herein, a mercury-free (and other heavy metal-free) product stream is provided at all temperatures, generally below 150° C., including ambient temperatures as well as elevated temperatures, such as those greater than 50° C. or greater than 100° C., leaving a cleaner fuel or product stream. The support described herein may be added at any point in a process system without requiring the system to be off line.

Although the foregoing description of embodiments have shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the one or more embodiments may manifest itself in other shapes and configurations as appropriate for the end use of the article made thereby.

What is claimed is:

1. A system comprising:
    a porous activated carbon support impregnated with powdered elemental selenium at a temperature of 650 degrees Celsius in a vacuum chamber, wherein the porous activated carbon support is made of a substrate made porous; and
    a liquid process stream at about 100 degrees Celsius in fluid communication with the support, wherein the process stream contains mercury for removal using the porous activated carbon support.

2. The system of claim 1, wherein the impregnated support has 6.5 wt. % or greater selenium.

3. The system of claim 1, wherein the porous support is shaped into particles or pellets about 10 mm in length or less.

4. A support comprising:
    an activated carbon substrate impregnated in a vacuum with powdered elemental selenium at 650 degrees Celsius to provide the support that is at a temperature greater than 100° C. and is suitable for use in removal of mercury from a liquid process stream, wherein the substrate is activated to become porous before being impregnated.

5. The support of claim 4, wherein the impregnated substrate has 6.5 wt. % or greater selenium.

6. A method comprising:
    preparing a porous support, wherein a substrate for the porous support is activated to become porous;
    impregnating the porous support with powdered selenium at 650 degrees Celsius in a vacuum environment to create an impregnated porous support;
    preparing a bed of the impregnated porous support;
    running a liquid process stream through the bed with the temperature of the porous support at about 100 degrees Celsius;
    removing mercury from the liquid process stream by sorbing mercury on the porous support, which is at a temperature of about 100 degrees Celsius;
    removing the porous support from the liquid process stream;
    regenerating the porous support by heating the porous support to above 150 degrees Celsius thereby desorbing the mercury from the porous support.

7. The method of claim 6, wherein the step of impregnating the porous support occurs for at least about 120 minutes.

8. The method of claim 6, wherein the step of impregnating the porous support includes placing the porous support with powdered selenium in an inert environment.

* * * * *